Jan. 9, 1940.     R. T. LOWD, JR., ET AL     2,186,647
GLASS WELDING APPARATUS
Filed March 31, 1938     2 Sheets-Sheet 1
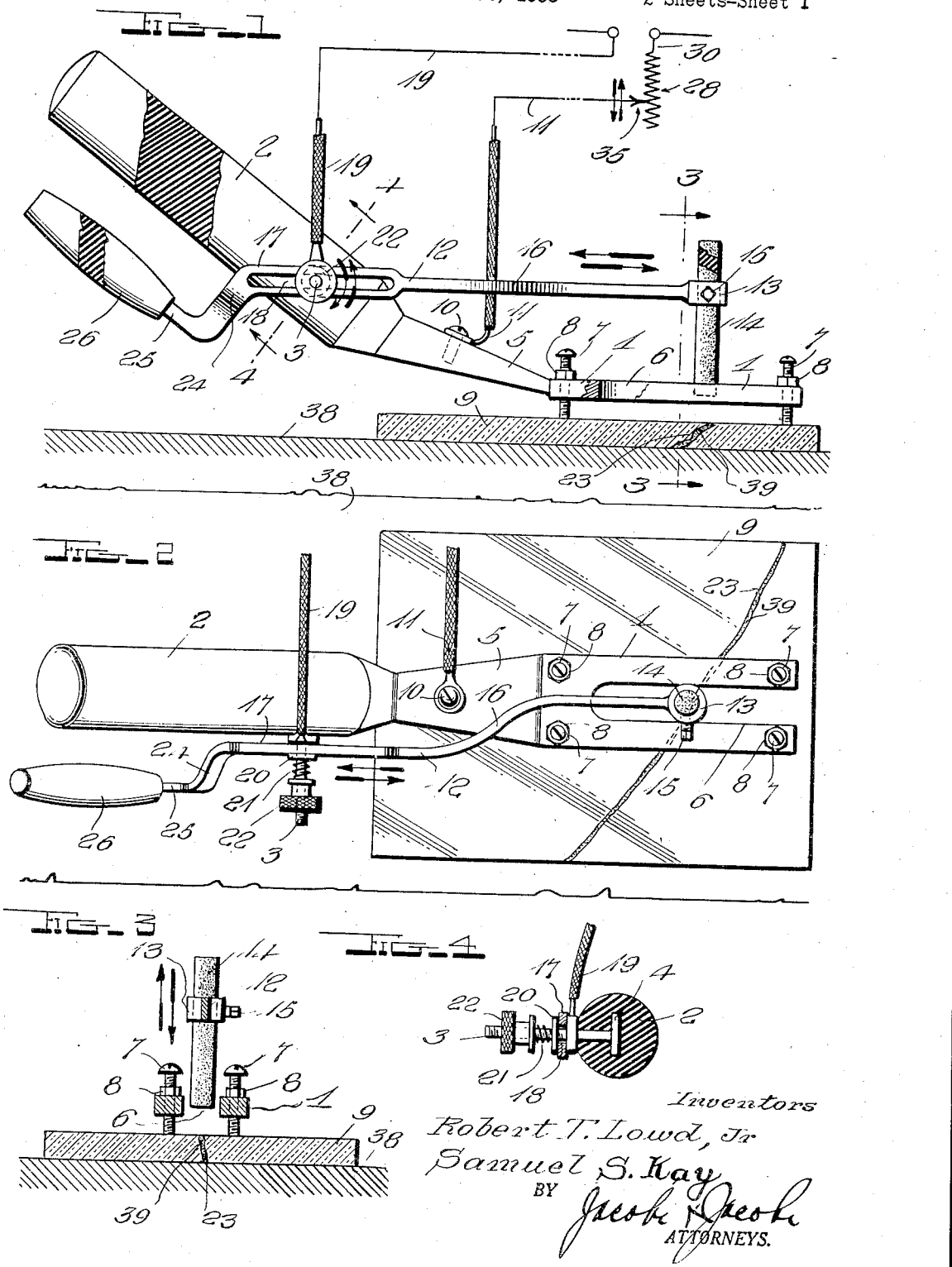
Inventors
Robert T. Lowd, Jr.
Samuel S. Kay
BY
Jacob & Jacob
ATTORNEYS.

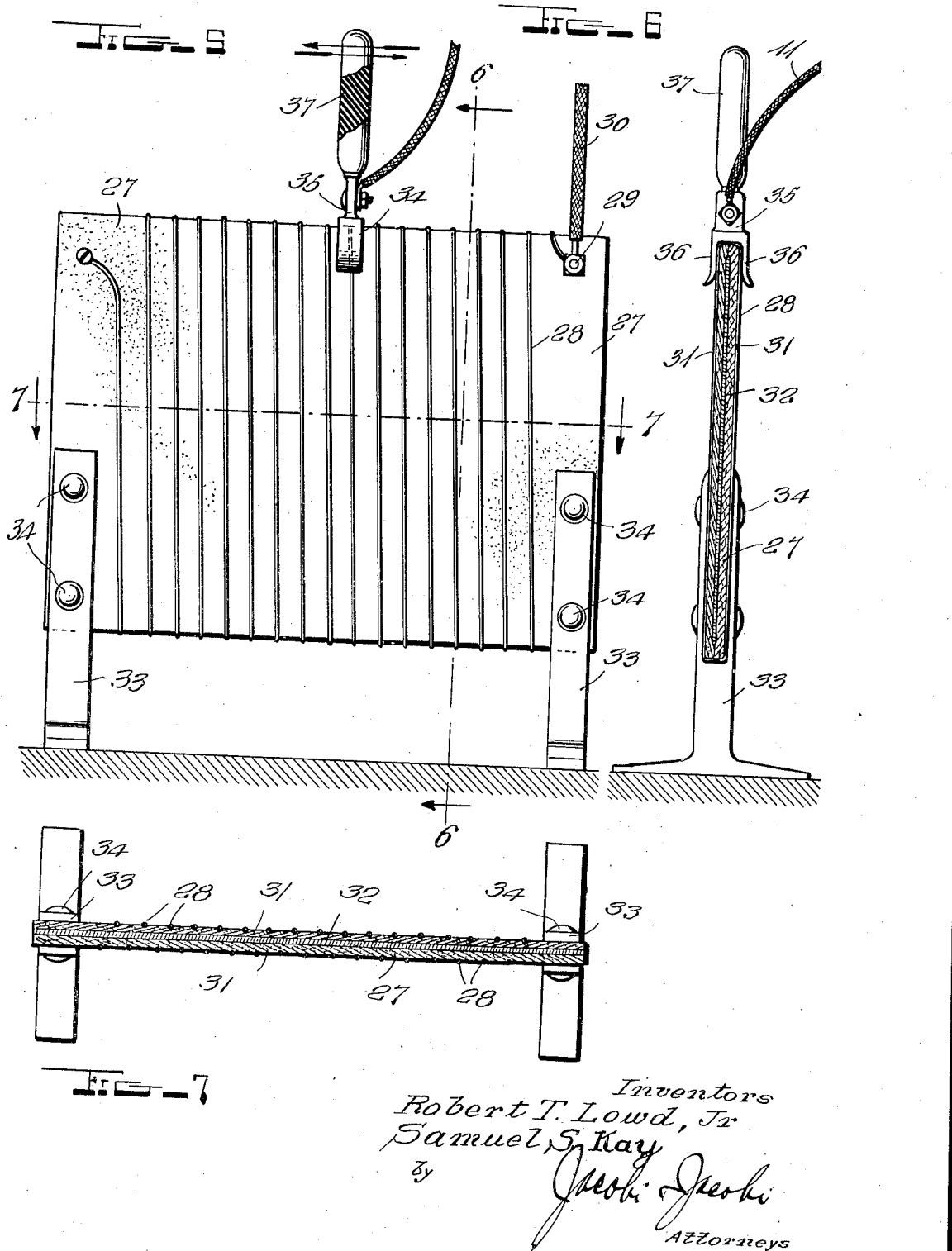

Patented Jan. 9, 1940

2,186,647

UNITED STATES PATENT OFFICE 2,186,647

GLASS WELDING APPARATUS

Robert T. Lowd, Jr., and Samuel S. Kay, Miami, Fla.

Application March 31, 1938, Serial No. 199,262

7 Claims. (Cl. 219—21)

This invention relates to a glass welding apparatus and it is one object of the invention to provide an apparatus by means of which a cracked sheet of glass may be mended, thus permitting a cracked sheet of glass to be repaired and use thereof continued instead of it being necessary to discard a cracked sheet of expensive plate glass and replace it with a new one.

Another object of the invention is to provide an apparatus of the character set forth by means of which powdered glass placed in a crack formed in a sheet of glass may be melted and fused with portions of the plate glass along the crack, thus causing portions of the plate glass along the crack to merge into each other and reestablish a union of the glass plate along the crack.

Another object of the invention is to provide a glass welding apparatus consisting of a relatively stationary member of conductive material adapted to be moved along the crack in the glass and a movable member shiftable towards and away from the stationary member and adapted to hold a carbon stick which when properly disposed with respect to the stationary member will cause an arc of flame between the carbon stick and the stationary member and create sufficient heat to melt the glass and causing fusing thereof.

Another object of the invention is to so form the stationary member that while it is stationary relative to the movable member it may be shifted along the crack together with the movable member and progressively cause powdered glass in the crack and portions of the glass sheet to be melted and fused together.

Another object of the invention is to so mount the movable member that it may be adjusted to a position in which the desired arc will be formed and then secured in the adjusted position.

Another object of the invention is to provide means for supporting the relatively stationary member a desired distance above the cracked sheet of glass which is to be repaired.

Another object of the invention is to provide improved resistance means for controlling the current which is supplied to the two members.

Still another object of the invention resides in providing a device which is simple and durable in construction, inexpensive to manufacture and one which will be very efficient in operation and application to use.

With these and numerous other objects in view, our invention consists in the novel features of construction, combination and arrangement of parts as will be hereinafter referred to and more particularly pointed out in the specification and claims.

The invention is illustrated in the accompanying drawings wherein:

Figure 1 is a view in side elevation showing the improved glass welding apparatus in position for use;

Figure 2 is a top plan view of the glass welding apparatus;

Figure 3 is a sectional view taken along the line 3—3 of Figure 1;

Figure 4 is a sectional view taken along the line 4—4 of Figure 1;

Figure 5 is a view in elevation of the resistance means used with the welding apparatus;

Figure 6 is a sectional view taken vertically through Figure 5 along the line 6—6; and Figure 7 is a sectional view taken along the line 7—7 of Figure 5.

The copper stationary member 1 of this improved glass welding apparatus has a handle 2 of insulating material such as Bakelite and from one side of this handle projects a threaded stem or pin 3 which is embedded in the handle as shown in Figure 4 and formed with a cross bar 4 at its inner end so that the stem will be firmly held in place and prevented from turning in the handle. The shank 5 of the stationary member extends from the front end of the handle and midway its width the stationary member is formed with a longitudinally extending slot 6 which leads from its front end. Screws 7 which constitute supporting posts for the stationary member are threaded through corner portions of the stationary member and lock nuts 8 are provided so that after the posts have been adjusted to support the stationary member the desired distance above a sheet of glass 9 the nuts may be tightened and the stationary member maintained the predetermined distance above the glass. A screw 10 is threaded into a socket formed in the shank 5 and constitutes a terminal for a conductor wire 11 by means of which current is supplied to the stationary member.

The movable member 12 is also formed of copper and consists of a narrow strip or bar which has a socket 13 at its front end through which a carbon stick 14 passes, the carbon stick being secured in an adjusted position by a set screw 15. The movable member of bar 12 is bent transversely as shown at 16 to dispose the forward portion of the movable member over the stationary member in vertical spaced relation to the slot 6 while an intermediate portion 17 of the movable member is disposed at one side of the handle 2. This intermediate portion of the movable member is of increased width and formed with a longitudinally extending slot 18 through which passes the stem 3, and referring to Figure 4 it will be seen that the terminal of the conductor wire 19 is disposed about the stem between the handle 1 and the movable member. A washer 20 fits about the stem against the outer face of the movable member and there has been provided a spring 21 which has one end abutting the movable member and its other end engaged by a nut 22 which is screwed upon the stem. By adjusting the nut the spring may be tensioned until sufficient friction is exerted to hold the movable member in an adjusted position. Therefore, the movable member may be tilted to raise and lower the carbon stick and it may also be shifted longitudinally to shift the carbon stick along the slot. It will thus be seen that the carbon stick can be adjusted both vertically and longitudinally of the stationary member and caused to accurately follow the crack 23 in the sheet of glass 9. Rearwardly of the slot 18 the movable member is bent outwardly as shown at 24 and terminates in a shank 25 which projects upwardly at a rearward incline and is embedded in a handle 26 formed of insulating material such as Bakelite. Since the handles 2 and 26 are both of insulating material which also has heat insulating qualities the device may be used without danger of receiving an electric shock or burning the hands.

In order to control the current which passes through the movable member and the stationary member there has been provided a resistance member illustrated in Figures 5, 6 and 7. This resistance member consists of a resistance wire which is coiled about the carrier 27 to form a resistance coil 28, one end of the coil being secured to a terminal bolt 29 to which a conductor wire 30 is also attached. Ends of the conductor wires 19 and 30 are secured to a conventional plug and when the plug is engaged in a wall socket as indicated in Figure 1 current will pass through the stationary member and the movable member. The carrier 27 consists of asbestos sheets 31 between which a reinforcing sheet 32 is disposed and in order to support the carrier there have been provided legs or standards 33 which are secured to lower corner portions of the carrier by rivets 34 and disposed in an upright position. The conductor 11 is secured to a clip 35 having forks 36 for straddling the carrier and gripping selected portions of the coil 28 and in order to easily apply or remove the clip there has been provided a handle 37 formed of insulating material.

When this apparatus is in use the sheet of glass which is cracked is placed flat upon a work table 38 and the crack filled with powdered glass as shown at 39. The stationary member is set in place upon the sheet of glass in bridging relation to the crack and when the current is turned on the movable member will be adjusted to dispose the carbon stick over the crack with its lower end extending into the slot. The clip 35 is shifted along the coil until the proper arc is established between the carbon stick and the stationary member at opposite sides of the slot and the heat created by the arc and radiated towards the sheet of glass will melt the powdered glass and also marginal portions of the sheet of glass along the crack so that the glass will be fused and the crack healed. If it is found that the stationary member is not disposed the proper distance above the sheet of glass it is merely necessary to adjust the screws 7 and then tighten the nuts 8 to secure the screws in the adjusted positions. The stationary member will be gradually shifted along the crack and the movable member also shifted longitudinally of the slot or vertically when found necessary in order to properly melt and fuse the glass. After the glass has been fused for the entire length of the crack the stationary member together with the movable member will be lifted from the sheet of glass and the glass sheet allowed to remain upon the table until it has cooled.

From the foregoing description of the construction of our improved device, the operation thereof and the method of applying the same to use, will be readily understood. It will be seen that we have provided a simple, inexpensive and efficient means for carrying out the objects of the invention and while we have particularly described the elements best adapted to perform the functions set forth, it is obvious that various changes in form, proportion and in the minor details of construction may be resorted to, without departing from the spirit or sacrificing any of the principles of the invention.

Having thus described the invention, what is claimed is:

1. In an apparatus of the character described, companion members of conductive material insulated from each other, one being shiftable bodily along a sheet of glass over a crack therein and having a horizontally elongated arcing surface, the other member being pivotally and slidably mounted for vertical and horizontal movements relative to the elongated arcing surface of the first member and carrying a carbon stick for cooperating with the first member to form an arc for fusing the glass along the crack therein.

2. In an apparatus of the character described, a relatively stationary member formed of conductive material and having a body portion and a shank, a handle of insulating material carried by the shank, said body being formed with a longitudinally extending slot, a movable member of conductive material, pivotally and slidably carried by said handle, said movable member having its forward portion disposed over the body of the stationary member, a carbon stick carried by said movable member and disposed over the slot, and a handle of insulating material for said movable member.

3. In an apparatus of the character described, a relatively stationary member of conductive material, a handle of insulating material for the stationary member, a stem projecting from said handle, a movable member of conductive material pivotally and slidably mounted upon said stem for vertical and horizontal movement relative to the stationary member, a handle of insulating material for said movable member, and a carbon stick carried by said movable member and disposed in cooperating relation to said stationary member.

4. In an apparatus of the character described, a relatively stationary member of conductive material formed with a longitudinally extending slot, a handle of insulating material for said stationary member, a stem projecting laterally from said handle, a movable member of conductive material having an intermediate portion disposed at a side of said handle and formed with a longitudinally extending slot through which said stem passes, a nut threaded upon said stem, a spring between the nut and movable member for creating frictional binding and holding the movable member in an adjusted position, said movable member having its front end portion disposed over said stationary member, a carbon stick carried by the front end of said movable member and disposed vertically over the slot therein, and a handle of insulating material carried by the rear end of the movable member.

5. In an apparatus of the character described, a movable member of conductive material having a horizontally elongated arcing surface, a handle of insulating material for said movable member, supports for holding the movable member spaced upwardly to predetermined distance above a sheet of glass, an adjustable member of conductive material carried by said handle and being shiftable vertically relative to the movable member into position to cooperate with the elongated arcing surface and form an arc for melting and fusing glass, said adjustable member being shiftable horizontally relative to the arcing surface of the movable member during movement of the movable member over a crack in the sheet of glass, and a handle of insulating material for said adjustable member.

6. In an apparatus of the character described, a relatively stationary member of conductive material formed with an elongated slot, a handle of insulating material for said stationary member, a movable member of conductive material pivotally carried by said handle and slidable longitudinally of the slot in the stationary member, a handle of insulating material for said movable member, and means for connecting circuit wires with the stationary member and the movable member.

7. In an apparatus of the character described, a relatively stationary member of conductive material formed with a passage, a handle of insulating material for said stationary member, a stem projecting laterally from said handle, a movable member of conductive material having its front portion disposed over said stationary member and an intermediate portion disposed at a side of said handle and pivotally and slidably mounted on said stem, a retainer carried by said stem, a spring between the retainer and the movable member for frictionally holding the movable member in an adjusted position, a carbon stick carried by said movable member and disposed vertically over the passage therein, and a handle of insulating material carried by the rear end of the movable member.

ROBERT T. LOWD, Jr.
SAMUEL S. KAY.